United States Patent [19]

Boucher

[11] Patent Number: 5,262,093
[45] Date of Patent: Nov. 16, 1993

[54] COWLING FOR A ROTARY SURFACE AERATOR USED FOR THE AERATION OF TANKS INTENDED FOR WATER TREATMENT

[75] Inventor: Serge Boucher, Villennes sur Seine, France

[73] Assignee: Degremont, Rueil Malmaison, France

[21] Appl. No.: 32,394

[22] Filed: Mar. 15, 1993

Related U.S. Application Data

[63] Continuation of Ser. No. 880,020, May 8, 1992, abandoned, which is a continuation of Ser. No. 672,433, Mar. 20, 1991, Pat. No. 5,124,085.

[30] Foreign Application Priority Data

Apr. 6, 1990 [FR] France ................ 90 04464

[51] Int. Cl.$^5$ ............................................. B01F 3/04
[52] U.S. Cl. ........................................ 261/91; 261/120; 210/242.2
[58] Field of Search ................ 261/91, 120; 210/242.2

[56] References Cited

U.S. PATENT DOCUMENTS

| | | | |
|---|---|---|---|
| 3,561,738 | 2/1971 | Galeano | 261/120 |
| 4,040,963 | 8/1977 | Garrott, Jr. | 210/242.2 |

FOREIGN PATENT DOCUMENTS

| | | | |
|---|---|---|---|
| 262717 | 4/1988 | European Pat. Off. | |
| 2123732 | 9/1972 | France . | |
| 2399272 | 2/1981 | France . | |
| 507164 | 6/1971 | Switzerland | 261/91 |
| 862761 | 3/1961 | United Kingdom | 261/91 |
| 1547115 | 6/1979 | United Kingdom | 261/91 |

*Primary Examiner*—Tim Miles
*Attorney, Agent, or Firm*—Pollock, VandeSande & Priddy

[57] ABSTRACT

Cowling for a rotary surface aerator used for the aeration of tanks intended for the aerobic treatment of water, consisting of a skirt surrounding the aerator, wherein the skirt is made of a flexible substance or material and is ballasted in its lower part.

3 Claims, 1 Drawing Sheet

COWLING FOR A ROTARY SURFACE AERATOR USED FOR THE AERATION OF TANKS INTENDED FOR WATER TREATMENT

This application is a continuation of Ser. No. 07/880,020 filed May 8, 1992 and now abandoned, which was a continuation of Ser. No. 07/672,433 filed Mar. 20, 1991 and now U.S. Pat. No. 5,124,085.

The present invention relates to rotary surface aerators equipping aeration tanks used in the aerobic treatment of water, especially by the activated-sludge process.

In order effectively to carry out such a process which involves the need for an efficient oxygenation of the water to be treated, use is made of aerators which are placed on the surface of the water and which execute a vigorous agitation allowing air to penetrate effectively into the medium present in the tank.

These aerators consist of a turbine, the blades of which are designed and calculated so as to carry out the most efficient agitation with a minimum amount of energy, this turbine being driven in rotation by means of a geared motor.

The aerators are mounted either on a stationary support or on a floating assembly.

Although these aerators are efficient, they nevertheless have the disadvantage of risking causing some nuisance, such as noise and the generation of mists brought about by the column of water which they raise which are undesirable in view of their composition.

To remedy this, these aerators are surrounded by cowlings which are of two types:

semi-rigid or rigid cylindrical cowlings made of polyethylene or metal, or cowlings with rigid inclined walls made of metal or polyester.

The disadvantage of the cylindrical cowlings is that they break up the energy of the column on the vertical wall.

With a cowling having inclined walls, this disadvantage, although reduced, is nonetheless still present, and moreover the cost of such an appliance is very high.

The invention makes it possible to avoid these disadvantages. It involves essentially producing the cowling with a skirt made of a flexible material and ballasted in its lower part.

The skirt can be in one piece, preformed and advantageously frustoconical.

It can also have a tulip shape, so that its lower edge is tangent to the water level.

Instead of being in one piece, the skirt according to the invention can consist of a plurality of strips of trapezoidal shape, mounted on a girdle, in such a way that, when the aerator is in operation, under the effect of the column thus produced, the skirt flares as a result of the relative sliding of its component strips on another, these strips-overlapping so as to ensure that the aerator is isolated from the environment in which it is located.

Two embodiments of the invention given solely by way of non-limiting examples are described below.

BRIEF DESCRIPTION OF THE DRAWINGS

In the course of this description, reference is made to the accompanying drawing in which:

FIG. 3a shows a partial plan view from above of the skirt in the position of the latter corresponding to that of FIG. 3;

FIG. 4a shows a plan view from above illustrating the assembly of the strips.

Figure 1:
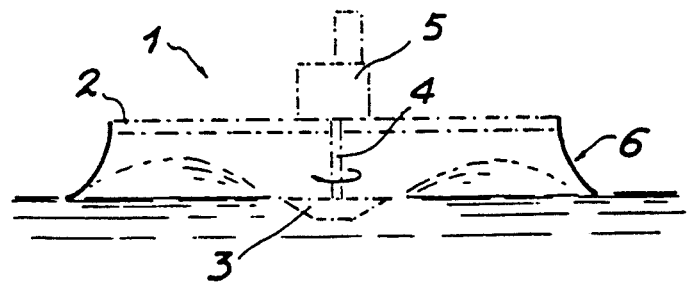
FIG. 1 shows a general diagrammatic view of an aerator equipped with a cowling consisting of a skirt according to the invention.

As can be seen in FIG. 1, the aerator 1 comprises, fixed to a frame 2, a turbine 3 driven in rotation by means of a shaft 4 from a geared motor 5.

Figure 2:
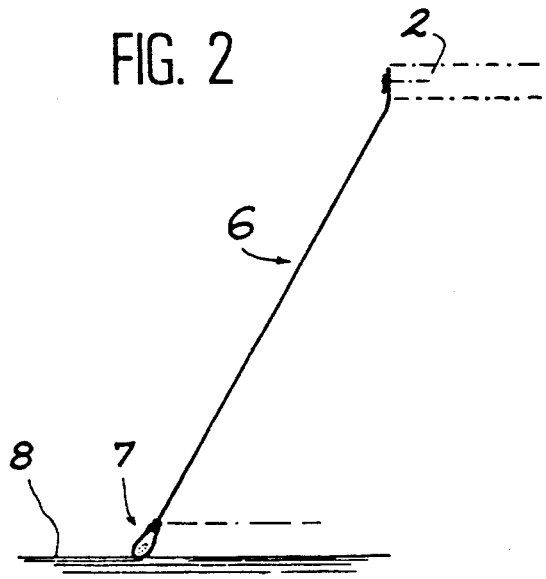
FIG. 2 shows a partial elevation and sectional view on a larger scale of a first embodiment of such a skirt.

This aerator is equipped with a cowling which, according to the invention, consists of a skirt 6, as shown more particularly in FIG. 2, preformed in one piece from a flexible material, for example, canvas.

In this case, the skirt is of regular frustoconical shape, its upper edge being fixed to the frame 2.

Its lower edge is equipped with a ballast 7 placed, for example, in a hem belonging to the relevant edge of the skirt.

So that its lower edge can more easily be in contact with the upper surface of the water, the lower part of the skirt can have a tulip shape over a greater or lesser height.

The mass adopted for the ballast is determined as a function of the weight of the skirt and of the forces exerted on it.

Figure 3:
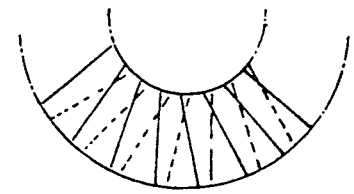
FIG. 3 shows a view, similar to that of FIG. 2, of another embodiment of the invention, the skirt being in the flared position.
Figure 3:
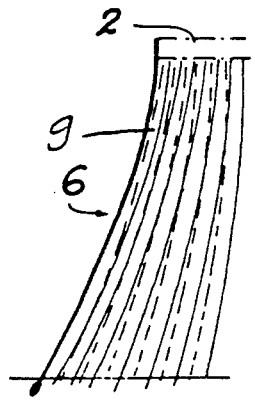
Figure 4:
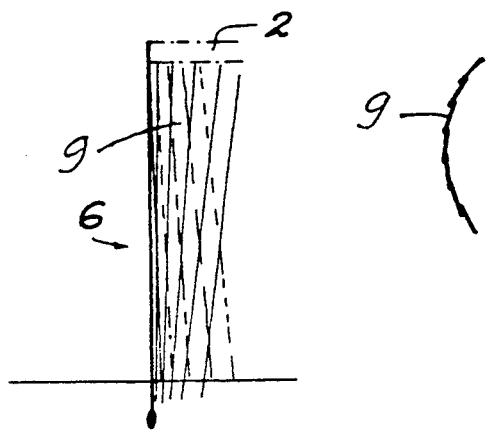
FIG. 4 shows a view, similar to that of FIG. 3, of the skirt which is shown there in the closed position, the aerator being inoperative.
Figure 4:

In the embodiment illustrated in FIGS. 3, 3a and 4, the skirt, instead of being in one piece, consists of a plurality of strips 9 made of a flexible material, such as canvas. These strips, instead of being cut straight with the thread of the material used, such as canvas, have a trapezoidal shape and are assembled with an overlap, as shown in FIG. 4a, on a girdle (not shown) fixed to the frame of the aerator.

Under these conditions, whereas the skirt is "straight", as shown in FIG. 4, when the aerator is not in operation, it flares outwardly towards the bottom when the aerator is in operation, as shown in FIGS. 3 and 3a, this occurring as a result of the sliding of its various component strips in relation to one another. In this position these strips overlap so as to isolate the atmosphere generated by the aerator from the environment.

At all events, whatever the embodiment adopted according to the invention, a skirt thus produced does not block the energy of the surface current in any way, and by sliding on the column generated by the aerator, mates with the end of this column, thus preventing it from diffusing into the surrounding atmosphere.

Moreover, the design of this skirt allows it to match the surface of the water and thereby to some extent follow the variations of the latter.

Finally, the invention is especially simple and economical to put into practice.

It goes without saying that it is not limited to the embodiments described and illustrated, but that it can give rise to various alternative versions, without thereby departing from its scope.

I claim:

1. A cowling surrounding a rotary surface aerator used for aerating water in tanks, said cowling comprising:

a ring-shaped frame located above the aerator and adapted to rotate therewith;

a flexible skirt for isolating the atmosphere generated by the aerator from the environment, said skirt surrounding the aerator and attached at an upper open end thereof around the frame, said skirt further having an open lower end, the body of said skirt being unsupported and free of contact with aerator components, allowing it to flare outwardly during aerator rotation; and, ballast means attached to a lower edge of said skirt, said ballast means having a mass dependent upon the weight of the skirt for counteracting centrifugal force exerted thereon during rotation to maintain said lower edge at the surface of the water.

2. A cowling according to claim 1 wherein the skirt is a single frustoconical member.

3. A cowling according to claim 1 wherein the lower edge of the skirt is curved for tangential orientation with the water's surface.

* * * * *